(12) United States Patent
Yoon et al.

(10) Patent No.: US 10,648,387 B1
(45) Date of Patent: May 12, 2020

(54) EXHAUST GAS POST PROCESSING APPARATUS

(71) Applicants: Hyundai Motor Company, Seoul (KR); Kia Motors Corporation, Seoul (KR); Korea Research Institute of Chemical Technology, Daejeon (KR)

(72) Inventors: Dalyoung Yoon, Seongnam-si (KR); Chang Hwan Kim, Seongnam-si (KR); Iljeong Heo, Daejeon (KR); Young Woo You, Daejeon (KR); Jin Hee Lee, Daejeon (KR)

(73) Assignees: Hyundai Motor Company, Seoul (KR); Kia Motors Corporation, Seoul (KR); Korea Research Institute of Chemical Technology, Daejeon (KR)

( * ) Notice: Subject to any disclaimer, the term of this patent is extended or adjusted under 35 U.S.C. 154(b) by 0 days.

(21) Appl. No.: 16/694,508

(22) Filed: Nov. 25, 2019

(30) Foreign Application Priority Data

May 22, 2019 (KR) .......................... 10-2019-0060268

(51) Int. Cl.
*F01N 3/28* (2006.01)
*F01N 3/10* (2006.01)

(52) U.S. Cl.
CPC .......... *F01N 3/2803* (2013.01); *F01N 3/101* (2013.01)

(58) Field of Classification Search
CPC ...... F01N 3/2083; F01N 3/101; F01N 3/2825; F01N 3/0835; F01N 3/0842
USPC ........................................ 422/171, 177, 180
See application file for complete search history.

(56) References Cited

U.S. PATENT DOCUMENTS

| 5,821,190 | A  | * | 10/1998 | Kurabayashi | ...... B01D 53/9418 502/178 |
| 6,767,855 | B2 | * | 7/2004  | Kasahara    | ............. B01D 53/945 502/63 |
| 7,601,671 | B2 | * | 10/2009 | LaBarge     | ............. B01D 53/945 502/240 |
| 7,875,250 | B2 | * | 1/2011  | Nunan       | ................. B01D 53/945 422/168 |
| 2005/0138916 | A1 | * | 6/2005 | Bonadies  | ................ F01N 3/021 60/275 |
| 2006/0075743 | A1 | * | 4/2006 | Li        | ........................... F01N 3/021 60/286 |

(Continued)

*Primary Examiner* — Tom P Duong
(74) *Attorney, Agent, or Firm* — Morgan, Lewis & Bockius LLP (57) ABSTRACT

An exhaust gas post processing apparatus of a gasoline vehicle may include a housing mounted on the exhaust pipe to receive the exhaust gas discharged from the engine and to exhaust the exhaust gas passed through rearward thereof, a front end honeycomb catalyst unit embedded in the housing to primarily purify the exhaust gas introduced into the housing through a front end portion of the housing, and a rear end honeycomb catalyst unit embedded in the housing to secondarily purify the exhaust gas via the front end honeycomb catalyst unit before flowing out to a rear end portion of the housing, wherein the front end honeycomb catalyst unit includes a powder type catalyst in which an iridium-ruthenium alloy is supported on an aluminum oxide support powder, and the rear end honeycomb catalyst unit includes three-way catalyst powder which is configured to remove carbon monoxide, nitrogen oxides, and hydrocarbons simultaneously.

9 Claims, 12 Drawing Sheets (56) References Cited

U.S. PATENT DOCUMENTS

| | | | |
|---|---|---|---|
| 2007/0006458 A1* | 1/2007 | Jankowski | B01D 46/00 29/890 |
| 2014/0112849 A1* | 4/2014 | Wen | B01J 23/10 423/210 |
| 2015/0152768 A1* | 6/2015 | Arulraj | F01N 3/2828 428/117 |
| 2019/0032533 A1* | 1/2019 | Solbrig | B01D 53/944 |

* cited by examiner

EXHAUST GAS POST PROCESSING APPARATUS

CROSS-REFERENCE TO RELATED APPLICATION

The present application claims priority to Korean Patent Application No. 10-2019-0060268 filed on May 22, 2019, the entire contents of which is incorporated herein for all purposes by this reference.

BACKGROUND OF THE INVENTION

Field of the Invention

The present invention relates to an exhaust gas post processing apparatus, more particularly, to an exhaust gas post processing apparatus including a three-way catalyst.

Description of Related Art

In general, to reduce carbon monoxide (CO), hydrocarbons (HC), particulate matter (PM), nitrogen oxides (NOx), etc. as a pollution material contained in an exhaust gas, an exhaust system of an engine includes an exhaust gas post-treatment device such as a diesel oxidation catalyst (DOC) device, a diesel particulate matter filter (DPF), a selective catalytic reduction (SCR) device, and a nitrogen oxide storage catalyst (Lean NOx Trap, LNT catalytic) device, etc.

However, applying these devices to gasoline engines leads to cost increases and inconvenience of maintenance and repair of the vehicle such as charging of the elements. Furthermore, in the case of the technology using the gasoline engine control, in the high load region, the NOx purification performance may deteriorate due to the lack of ammonia (NH3). In the high load region of the lean burn gasoline engine, the NOx purification performance may be excessively deteriorated.

Recently, as a technique for eliminating such a problem and performing post-treatment of exhaust gas of a gasoline engine in accordance with the regulations of the environmentally friendly vehicle, three-way catalytic converter (TWC) configured to simultaneously remove carbon monoxide, nitrogen oxides, and hydrocarbons based on at least one catalyst of palladium (Pd), platinum (Pt), and rhodium (Rh)(mainly palladium or a combination of at least one of platinum and rhodium with palladium) has been developed and applied to the exhaust gas post-treatment system of gasoline engines.

However, the post-treatment of the exhaust gas using the three-way catalyst requires control to alternate the fuel lean and fuel rich conditions of the engine to oxidize carbon monoxide and hydrocarbons as well as reduce nitrogen oxides. In fuel rich conditions, nearly 100% of the harmful components of the exhaust gases, including nitrogen oxides, are removed, but in a slightly lean region having an air-fuel ratio ($\lambda$) of 1.00 to 1.05, the NOx purification performance is drastically reduced, and the NOx slips, increasing the possibility of exceeding emission regulations.

Furthermore, to increase the reduction of carbon monoxide, hydrocarbons and nitrogen oxides through air-fuel ratio operation, the air to fuel ratio needs to be very precisely controlled, and when a catalyst configured for operating in a slightly lean region having an air-fuel ratio $\lambda$ of 1.00 to 1.05 is developed, the technical and economic burden on the control may be reduced.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing an exhaust gas post processing apparatus including an exhaust gas purification catalyst to have high efficiency nitrogen oxide purification performance in slightly lean region with air-fuel ratio ($\lambda$) of 1.00 to 1.05.

An exhaust gas post processing apparatus of a gasoline vehicle provided on an exhaust pipe connected to the exhaust side of an engine to purify exhaust gas of the gasoline engine according to an exemplary embodiment of the present invention includes a housing mounted on the exhaust pipe to receive the exhaust gas discharged from the engine and to exhaust the exhaust gas passed through rearward thereof, a front end honeycomb catalyst unit embedded in the housing to primarily purify the exhaust gas introduced into the housing through a front end portion of the housing, and a rear end honeycomb catalyst unit embedded in the housing to secondarily purify the exhaust gas via the front end honeycomb catalyst unit before flowing out to a rear end portion of the housing, wherein the front end honeycomb catalyst unit includes a powder type catalyst (IrRu/Al2O3; IRA powder catalyst) in which an iridium-ruthenium alloy (IrRu) is supported on an aluminum oxide (Al2O3) support powder, and the rear end honeycomb catalyst unit includes three-way catalyst (TWC) powder which is configured to remove carbon monoxide, nitrogen oxides, and hydrocarbons simultaneously.

Iridium (Ir) contained in the iridium-ruthenium alloy (IrRu) may be formed to include 1.6 wt % to 2.4 wt % on the catalyst powder.

Ruthenium (Ru) contained in the iridium-ruthenium alloy (IrRu) may be formed to include 0.8 wt % to 1.2 wt % on the catalyst powder.

The IRA powder catalyst may be formed by heat treatment at a temperature of 850° C. or more and 1100° C. or less.

Meanwhile, the front end honeycomb catalyst unit may be formed by physically mixing the IRA powder catalyst and the three-way catalyst powder, and the rear end honeycomb catalyst unit may be formed by a catalyst unit in which coating layers of the IRA powder catalyst and the three-way catalyst powder are respectively mounted separately.

Meanwhile, the front end honeycomb catalyst unit may be formed by a catalyst unit in which coating layers of the IRA powder catalyst and the three-way catalyst powder are respectively mounted separately, and the rear end honeycomb catalyst unit may be formed by a catalyst unit in which coating layers of the IRA powder catalyst and the three-way catalyst powder are respectively mounted separately.

Meanwhile, the front end honeycomb catalyst unit may be formed by a catalyst unit in which coating layers of the IRA powder catalyst and the three-way catalyst powder are respectively mounted separately, and the rear end honeycomb catalyst unit may be formed by physically mixing the IRA powder catalyst and the three-way catalyst powder.

Meanwhile, the front end honeycomb catalyst unit may be formed by a catalyst unit in which coating layers of the IRA powder catalyst and the three-way catalyst powder are respectively mounted separately, and the rear end honeycomb catalyst unit may be formed by a three-way catalyst honeycomb.

Meanwhile, the front end honeycomb catalyst unit may be formed by physically mixing the IRA powder catalyst and the three-way catalyst powder, and the rear end honeycomb catalyst unit may be formed by physically mixing the IRA powder catalyst and the three-way catalyst powder.

According to an exemplary embodiment of the present invention, in a slightly lean gasoline engine operating region having an air-fuel ratio ($\lambda$) of 1.00 to 1.05, the nitrogen oxides, which is difficult to purify with a conventional three-way catalyst, is reacted with the reducing agent (CO, THC, H2) to purify the nitrogen oxides. Furthermore, by allowing the three-way catalyst to purify carbon monoxide (CO) and hydrocarbons (THC), it is possible to improve the purification performance of three harmful gases including nitrogen oxides.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Exemplary embodiments of the present application will be described more fully hereinafter with reference to the accompanying drawings, in which exemplary embodiments of the present invention are shown. As those skilled in the art would realize, the described embodiments may be modified in various different ways, all without departing from the spirit or scope of the present invention.

Furthermore, in exemplary embodiments of the present invention, since like reference numerals designate like elements having the same configuration, various exemplary embodiments is representatively described, and in other exemplary embodiments of the present invention, only configurations different from the various exemplary embodiments will be described.

The drawings are schematic, and are not illustrated in accordance with a scale. Relative dimensions and ratios of portions in the drawings are illustrated to be exaggerated or reduced in size for clarity and convenience, and the dimensions are just exemplified and are not limiting. Furthermore, like structures, elements, or components illustrated in two or more drawings use same reference numerals for showing similar features. It will be understood that when an element such as a layer, film, region, or substrate is referred to as being "on" another element, it may be directly on the other element or intervening elements may also be present.

The exemplary embodiment of the present invention shows an exemplary embodiment of the present invention in detail. As a result, various modifications of the drawings will be expected. Therefore, the exemplary embodiment of the present invention is not limited to a specific aspect of the illustrated region, and for example, includes modifications of an aspect by manufacturing.

Now, an exhaust gas post processing apparatus according to an exemplary embodiment of the present invention will be described with reference to FIG. 1.

Figure 1:
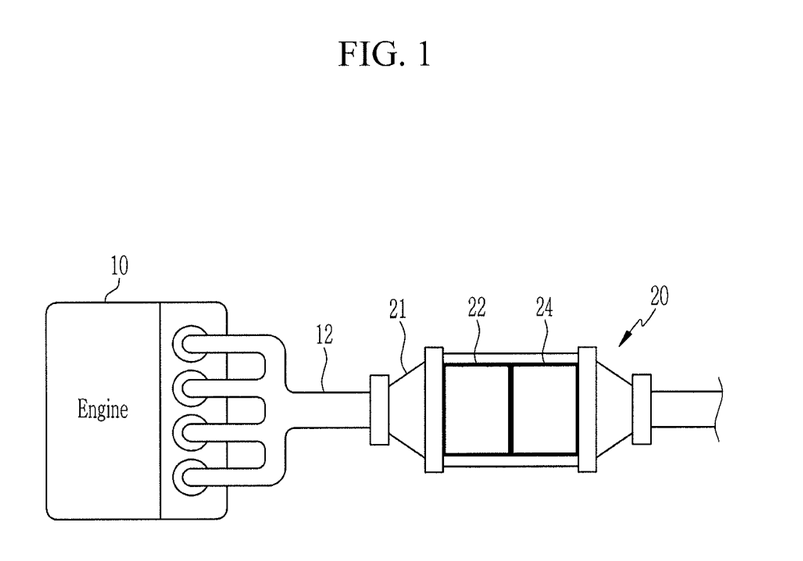
FIG. 1 is a schematic diagram of an exhaust gas post processing apparatus according to an exemplary embodiment of the present invention.

FIG. 1 is a schematic diagram of an exhaust gas post processing apparatus according to an exemplary embodiment of the present invention.

Referring to FIG. 1, an exhaust gas post processing apparatus 20 according to an exemplary embodiment of the present invention is provided on an exhaust pipe 12 connected to the exhaust side of an engine 10 to purify exhaust gas of the gasoline engine 10, and includes a housing 21 mounted on the exhaust pipe 12, a front end honeycomb catalyst unit 22 and a rear end honeycomb catalyst unit 24 embedded in the housing 21. In FIG. 1, a portion of the housing 21 is cut to show the configuration of the front end honeycomb catalyst unit 22 and the rear end honeycomb catalyst unit 24.

The engine 10 burns air-fuel mixture in which fuel and air are mixed to convert chemical energy into mechanical energy. The engine 10 includes a plurality of combustion chambers for generating a driving force by combustion of fuel, and is connected to an intake manifold to receive the air in a combustion chamber, and is connected to an exhaust manifold such that exhaust gas generated in combustion process is gathered in the exhaust manifold and is expelled to the external. An injector is mounted in the combustion chamber to inject the fuel into the combustion chamber.

The exhaust pipe 12 is connected to the exhaust side of the engine 10 to exhaust the exhaust gas discharged from the engine 10 to the outside. Meanwhile, the exhaust pipe 12 may extend rearward along the under floor of the vehicle to exhaust the exhaust gas to the rear of the vehicle, and the arrangement of the exhaust pipe 12 and the connection with the exhaust side of the engine 10 will be apparent to those skilled in the art (hereinafter, those skilled in the art), so that detailed description thereof will be omitted.

The exhaust gas discharged from the engine 10 passes through the exhaust pipe 12 and passes through the exhaust gas post processing apparatus 20. Furthermore, the exhaust gas passing through the exhaust gas post processing apparatus 20 passes through the front end honeycomb catalyst unit 22 and the rear end honeycomb catalyst unit 24 in sequence. That is, the front end portion of the housing 21 is connected to the engine 10 by the exhaust pipe 12 to receive the exhaust gas discharged from the engine 10, and the rear end portion of the housing 21 is connected to the exhaust gas purification system 20 to discharge the exhaust gas passed through the exhaust pipe 12 rearward of the vehicle. Here, the front end portion and the rear end portion of the component refer to the flow of the exhaust gas, and the exhaust gas is defined as flowing from the front end portion to the rear end portion of the component.

The front end honeycomb catalyst unit 22 is configured to primarily purify the exhaust gas flowing into the housing 21 through a front end portion of the housing 21. The front end honeycomb catalyst unit 22 may include a powder type catalyst (IrRu/Al2O3; IRA powder catalyst) in which an iridium-ruthenium alloy (IrRu) is supported on an aluminum oxide (Al2O3) support powder. At the instant time, iridium (Ir) contained in the iridium-ruthenium alloy (IrRu) may be formed to include 1.6 wt % to 2.4 wt % on the catalyst powder. Furthermore, iridium (Ir) contained in the iridium-ruthenium alloy (IrRu) may be formed to include 1.6 wt % to 2.4 wt % on the catalyst powder. The IRA powder catalyst may be formed by heat treatment at a temperature of 850° C. or more and 1100° C. or less.

The rear end honeycomb catalyst unit 24 is configured to secondarily purify the exhaust gas passing through the front end honeycomb catalyst unit 22 before the exhaust gas flows out to a rear end portion of the housing 21. The rear end honeycomb catalyst unit 24 may include three-way catalyst (TWC) powder which is configured to remove carbon monoxide (CO), nitrogen oxides (NOx), and hydrocarbons (THC) simultaneously.

Figure 2:
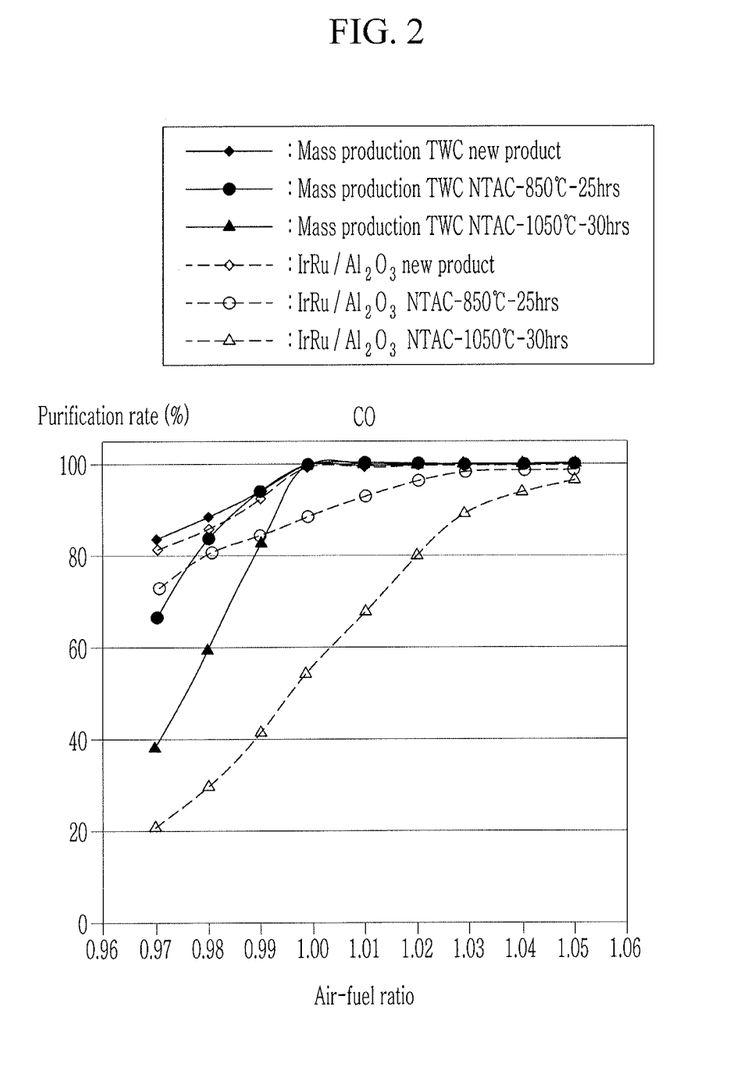
FIG. 2 is a graph showing a comparison of purification performance of carbon monoxide (CO) before and after deterioration between the mass production honeycomb type three-way catalyst and the IRA honeycomb catalyst of the exhaust gas post processing apparatus according to an exemplary embodiment of the present invention.
Figure 3:
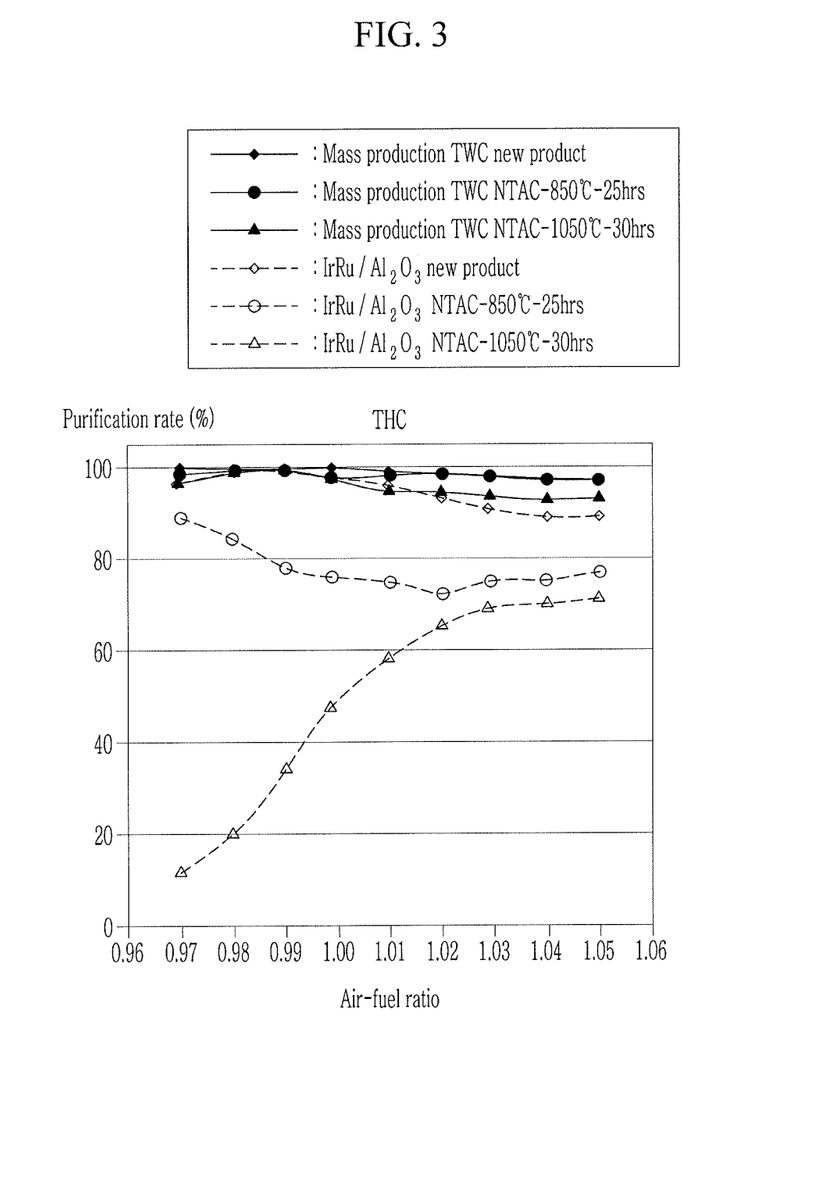
FIG. 3 is a graph showing a comparison of purification performance of hydrocarbons (THC) before and after deterioration between the mass production honeycomb type three-way catalyst and the IRA honeycomb catalyst of the exhaust gas post processing apparatus according to an exemplary embodiment of the present invention.
Figure 4:
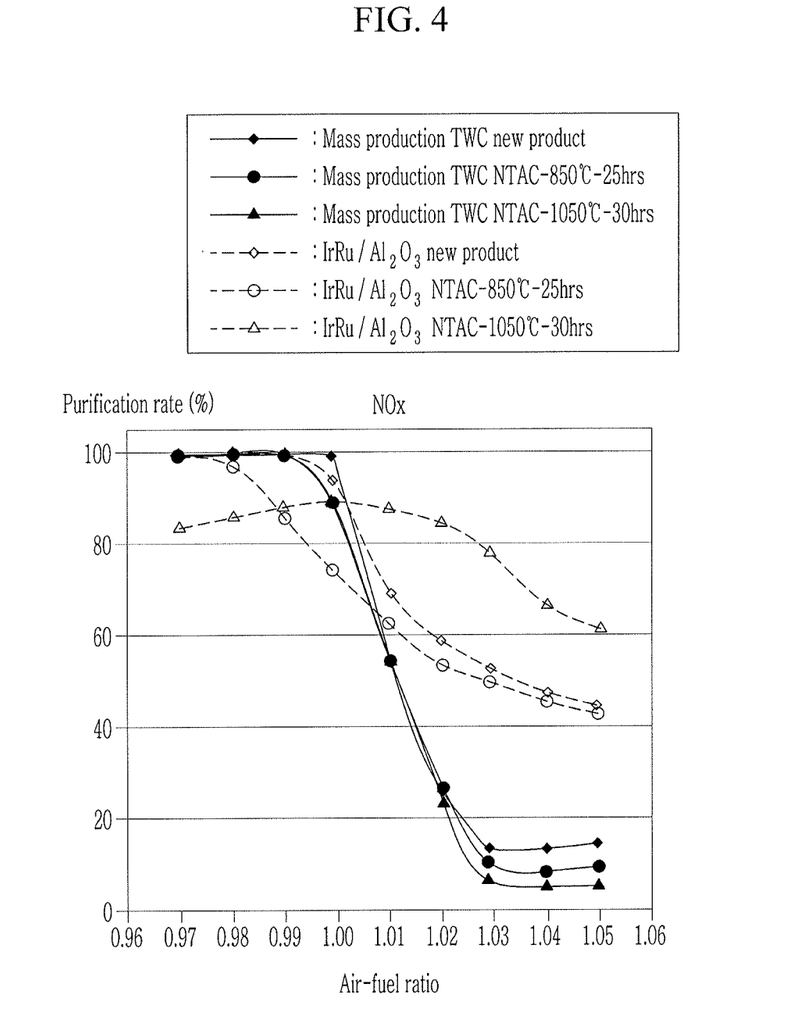
FIG. 4 is a graph showing a comparison of purification performance of nitrogen oxides (NOx) before and after deterioration between the mass production honeycomb type three-way catalyst and the IRA honeycomb catalyst of the exhaust gas post processing apparatus according to an exemplary embodiment of the present invention.

FIG. 2 is a graph showing a comparison of purification performance of carbon monoxide (CO) before and after deterioration between the mass production honeycomb type three-way catalyst and the IRA honeycomb catalyst of the exhaust gas post processing apparatus according to an exemplary embodiment of the present invention, FIG. 3 is a graph showing a comparison of purification performance of hydrocarbons (THC) before and after deterioration between the mass production honeycomb type three-way catalyst and the IRA honeycomb catalyst of the exhaust gas post processing apparatus according to an exemplary embodiment of the present invention, and FIG. 4 is a graph showing a comparison of purification performance of nitrogen oxides (NOx) before and after deterioration between the mass production honeycomb type three-way catalyst and the IRA honeycomb catalyst of the exhaust gas post processing apparatus according to an exemplary embodiment of the present invention.

Referring to FIG. 2, FIG. 3 and FIG. 4, comparison of the purification performance of carbon monoxide (CO), hydrocarbons (THC) and nitrogen oxides (NOx) of a honeycomb type three-way catalyst in mass production and an IRA honeycomb catalyst including less than about 2 wt % of iridium and about 1 wt % of ruthenium was shown.

Under conditions of evaluation temperature 400 degree® C. and air-fuel ratio 0.97 or more and 1.05 or less, CO purification performance was derived by use of new products, deteriorated products that have elapsed for about 25 hours at a deterioration temperature of about 850° C., and deteriorated products that have elapsed for about 30 hours at a deterioration temperature of about 1050° C. of mass production honeycomb type three-way catalyst and IRA honeycomb catalyst.

As shown in FIG. 2, FIG. 3 and FIG. 4, the purification performance of carbon monoxide (CO) and hydrocarbons (THC) is superior to mass production honeycomb type three-way catalysts over IRA honeycomb catalysts regardless of deterioration conditions.

However, in the case of NOx, in mass production honeycomb type three-way catalyst, the NOx purification performance is drastically reduced in the region where the air-fuel ratio ($\lambda$) is greater than about 1.00, regardless of the degradation before and after. In the region where the air-fuel ratio ($\lambda$) is greater than about 1.03 after deterioration, the NOx purification performance decreases with increasing deterioration temperature, which is about 10%.

In comparison, when the IRA honeycomb catalyst is new and deteriorated after about 25 hours at the deterioration temperature of about 850° C., it exhibits about 50% nitrogen oxide purification performance at an air-fuel ratio ($\lambda$) of about 1.03, and when the IRA honeycomb catalyst is a deteriorated product that has elapsed about 30 hours at a deterioration temperature of about 1050° C., it exhibits about 80% nitrogen oxide purification performance at an air-fuel ratio (λ) of about 1.03. from this, compared to the same deterioration conditions (degradation products that elapsed for about 30 hours at the deterioration temperature of about 1050° C.) with the mass production honeycomb type three-way catalyst, it can be seen that the nitrogen oxide purification performance was improved by about 70% or more at the air-fuel ratio (λ) of about 1.03.

Accordingly, through catalyst combination system of mass production three-way catalyst and IRA catalyst in honeycomb type or powder form, in the vicinity of the air-fuel ratio (λ) of about 1.00, which is a general gasoline engine operating region, the three-way catalyst can mainly are configured to purify the exhaust gas, and when the gasoline engine control is intermittently made in the region of the air-fuel ratio (λ) of about 1.00 or more, the IRA catalyst may be further purged of nitrogen oxides that cannot be purified by the three-way catalyst.

Figure 5:
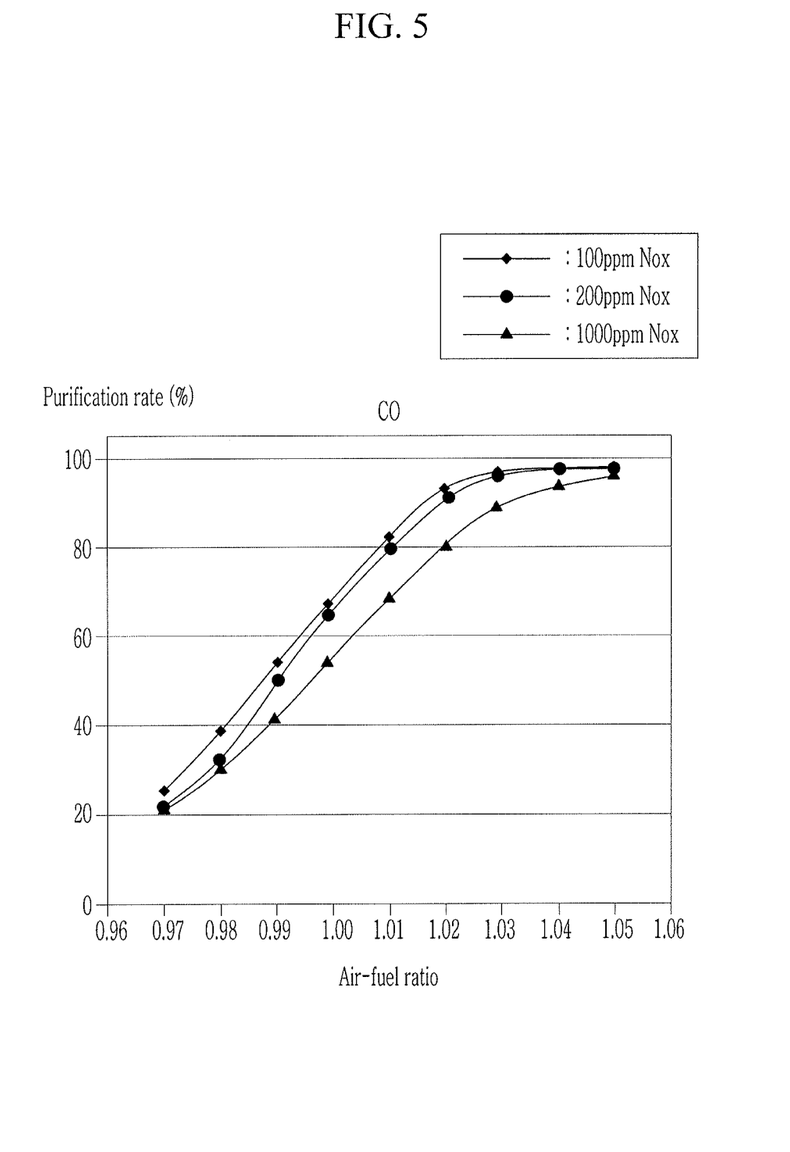
FIG. 5 is a graph showing a comparison of purification performance of carbon monoxide (CO) according to nitrogen oxides (NOx) concentration after deterioration of the IRA honeycomb catalyst of the exhaust gas post processing apparatus according to an exemplary embodiment of the present invention.
Figure 6:
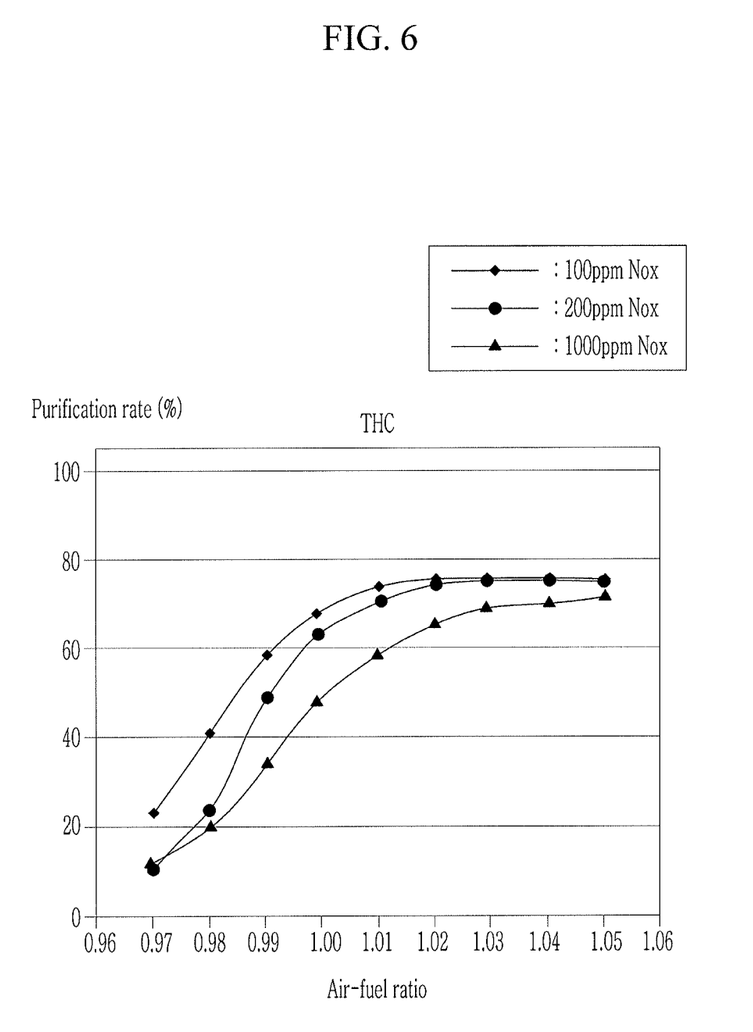
FIG. 6 is a graph showing a comparison of purification performance of hydrocarbons (THC) according to nitrogen oxides (NOx) concentration after deterioration of the IRA honeycomb catalyst of the exhaust gas post processing apparatus according to an exemplary embodiment of the present invention.
Figure 7:
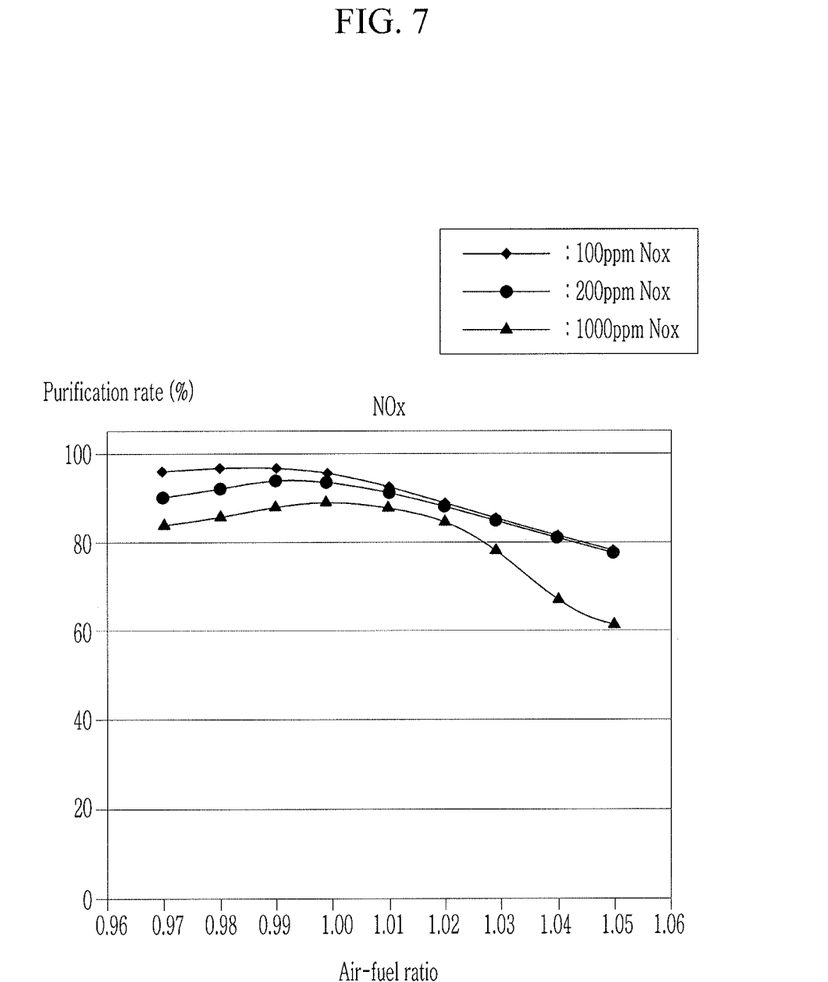
FIG. 7 is a graph showing a comparison of purification performance of nitrogen oxides (NOx) according to nitrogen oxides (NOx) concentration after deterioration of the IRA honeycomb catalyst of the exhaust gas post processing apparatus according to an exemplary embodiment of the present invention.

FIG. 5 is a graph showing a comparison of purification performance of carbon monoxide (CO) according to nitrogen oxide (NOx) concentration after deterioration of the IRA honeycomb catalyst of the exhaust gas post processing apparatus according to an exemplary embodiment of the present invention, FIG. 6 is a graph showing a comparison of purification performance of hydrocarbons (THC) according to nitrogen oxide (NOx) concentration after deterioration of the IRA honeycomb catalyst of the exhaust gas post processing apparatus according to an exemplary embodiment of the present invention, and FIG. 7 is a graph showing a comparison of purification performance of nitrogen oxides (NOx) according to nitrogen oxide (NOx) concentration after deterioration of the IRA honeycomb catalyst of the exhaust gas post processing apparatus according to an exemplary embodiment of the present invention.

Referring to FIG. 5 to FIG. 7, the purification performances of carbon monoxide (CO), hydrocarbons (THC), and nitrogen oxides (NOx) were compared and evaluated under conditions of an evaluation temperature of 400° C. and an air-fuel ratio of 0.97 or more and 1.05 or less of IRA honeycomb catalyst including about 2 wt % or less of iridium and about 1 wt % of ruthenium.

As shown in FIG. 5 to FIG. 7, when nitrogen oxide concentration decreases from 1000 ppm to 100 ppm, regardless of the air-fuel ratio (k), the purification performance of carbon monoxide (CO), hydrocarbons (THC), and nitrogen oxides (NOx) of the IRA honeycomb catalyst after degradation of the IRA honeycomb catalyst may be confirmed to be equivalent or improved. When the concentration of nitrogen oxides (NOx) is 100 ppm to 200 ppm, it may be seen that the purification performance of the nitrogen oxides (NOx) of the IRA honeycomb catalyst is about 80% at an air-fuel ratio (λ) of about 1.05.

Figure 8:
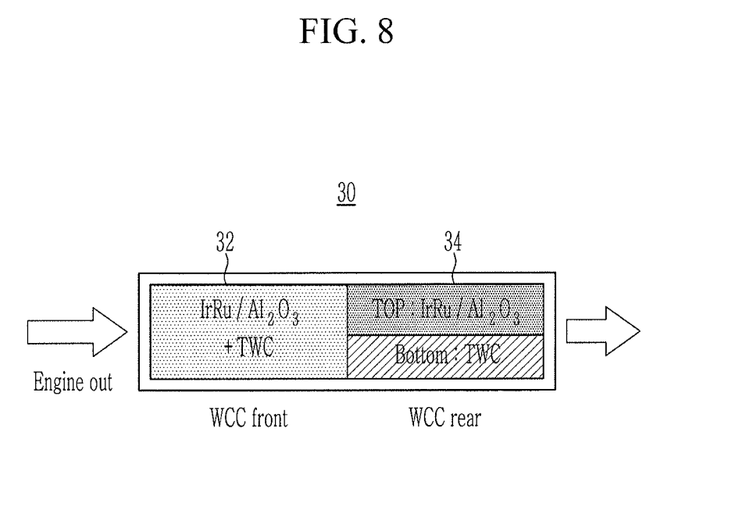
FIG. 8 is a schematic diagram of an exhaust gas post processing apparatus according to various exemplary embodiments of the present invention.
Figure 9:
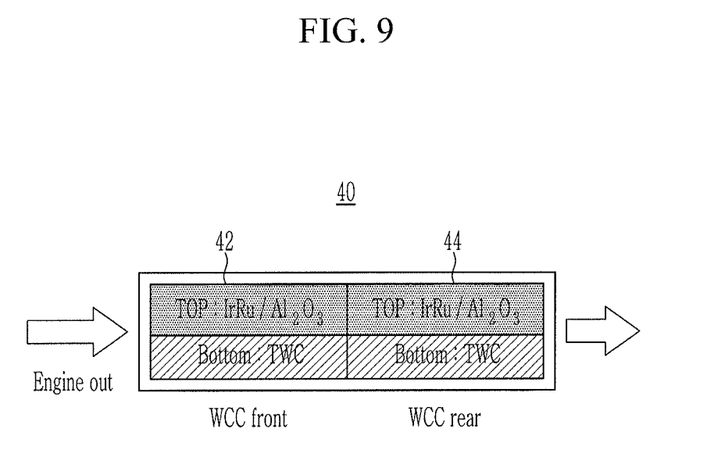
FIG. 9 is a schematic diagram of an exhaust gas post processing apparatus according to various exemplary embodiments of the present invention.
Figure 10:
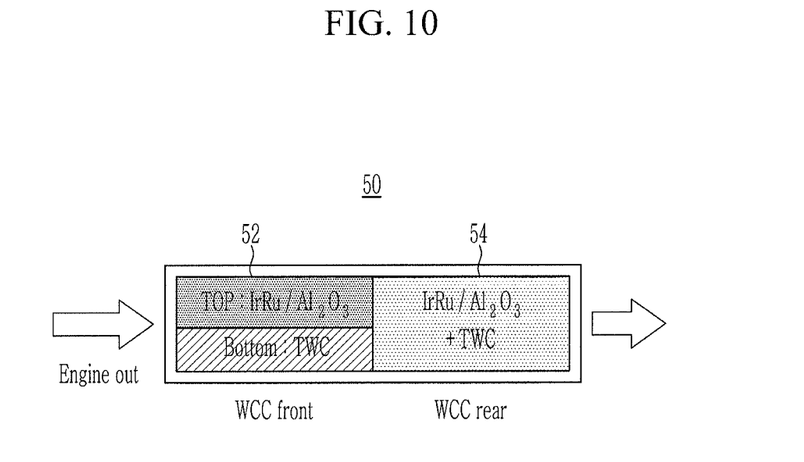
FIG. 10 is a schematic diagram of an exhaust gas post processing apparatus according to various exemplary embodiments of the present invention.
Figure 11:
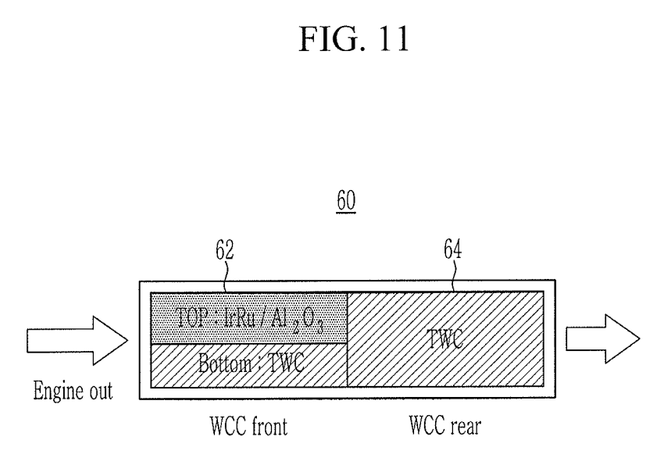
FIG. 11 is a schematic diagram of an exhaust gas post processing apparatus according to various exemplary embodiments of the present invention.
Figure 12:
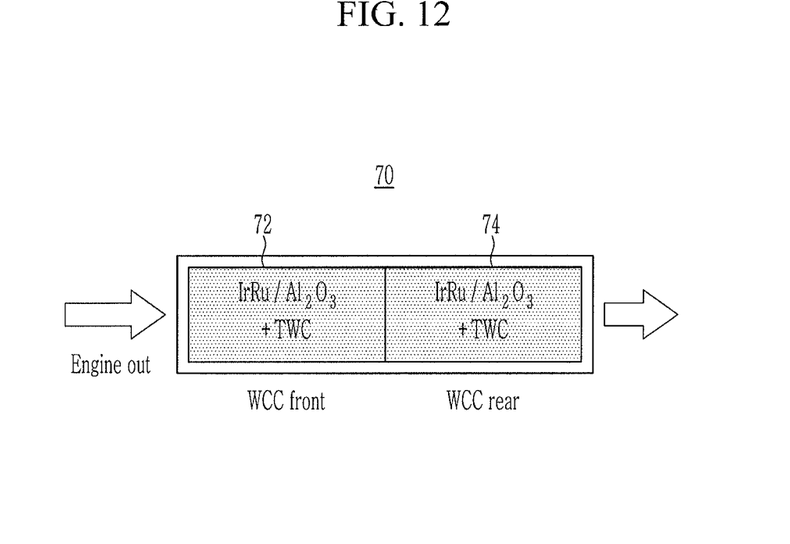
FIG. 12 is a schematic diagram of an exhaust gas post processing apparatus according to various exemplary embodiments of the present invention.

FIG. 8, GIG. 9, FIG. 10, FIG. 11, and FIG. 12 are schematic configuration diagrams of an exhaust gas post processing apparatus according to various exemplary embodiments of the present invention.

As shown in FIG. 8, the exhaust gas post processing apparatus 30 may include a front end honeycomb catalyst unit 32 formed by physically mixing the IRA powder catalyst and the three-way catalyst powder, and a rear end honeycomb catalyst unit 34 formed by a catalyst unit in which coating layers of the IRA powder catalyst and the three-way catalyst powder are respectively mounted separately.

Furthermore, as shown in FIG. 9, the exhaust gas post processing apparatus 40 may include a front end honeycomb catalyst unit 42 formed by a catalyst unit in which coating layers of the IRA powder catalyst and the three-way catalyst powder are respectively mounted separately, and a rear end honeycomb catalyst unit 44 formed by a catalyst unit in which coating layers of the IRA powder catalyst and the three-way catalyst powder are respectively mounted separately.

Furthermore, as shown in FIG. 10, the exhaust gas post processing apparatus 50 may include a front end honeycomb catalyst unit 52 formed by a catalyst unit in which coating layers of the IRA powder catalyst and the three-way catalyst powder are respectively mounted separately, and a rear end honeycomb catalyst unit 54 formed by physically mixing the IRA powder catalyst and the three-way catalyst powder.

Furthermore, as shown in FIG. 11, the exhaust gas post processing apparatus 60 may include a front end honeycomb catalyst unit 62 formed by a catalyst unit in which coating layers of the IRA powder catalyst and the three-way catalyst powder are respectively mounted separately, and a rear end honeycomb catalyst unit 64 formed by only a three-way catalyst honeycomb.

Furthermore, as shown in FIG. 12, the exhaust gas post processing apparatus 70 may include a front end honeycomb catalyst unit 72 formed by physically mixing the IRA powder catalyst and the three-way catalyst powder, and a rear end honeycomb catalyst unit 74 formed by physically mixing the IRA powder catalyst and the three-way catalyst powder.

Like this, according to an exemplary embodiment of the present invention, in a slightly lean gasoline engine operating region having an air-fuel ratio (λ) of 1.00 to 1.05, the nitrogen oxides, which is difficult to purify with a conventional three-way catalyst, is reacted with the reducing agent (CO, THC, H2) to purify the nitrogen oxides. Furthermore, by allowing the three-way catalyst to purify carbon monoxide (CO) and hydrocarbons (THC), it is possible to improve the purification performance of three harmful gases including nitrogen oxides.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An exhaust gas post processing apparatus mounted on an exhaust pipe connected to an exhaust side of an engine to purify exhaust gas of the engine in a gasoline vehicle, the apparatus comprising:

a housing mounted on the exhaust pipe to receive the exhaust gas discharged from the engine and to exhaust the exhaust gas passed rearward the housing;

a front end honeycomb catalyst unit embedded in the housing to purify the exhaust gas introduced into the housing through a front end portion of the housing; and a rear end honeycomb catalyst unit embedded in the housing and mounted in a rear of the front end honeycomb catalyst unit to further purify the exhaust gas purified via the front end honeycomb catalyst unit before flowing out to a rear end portion of the housing, wherein the front end honeycomb catalyst unit includes a powder type catalyst including an IRA powder catalyst (IrRu/Al2O3), in which an iridium-ruthenium alloy (IrRu) is supported on an aluminum oxide (Al2O3) support powder, and wherein the rear end honeycomb catalyst unit includes three-way catalyst (TWC) powder which removes carbon monoxide, nitrogen oxides, and hydrocarbons.

2. The exhaust gas post processing apparatus of claim 1, wherein iridium (Ir) contained in the iridium-ruthenium alloy (IrRu) includes 1.6 wt % to 2.4 wt % on the catalyst powder.

3. The exhaust gas post processing apparatus of claim 1, wherein ruthenium (Ru) contained in the iridium-ruthenium alloy (IrRu) includes 0.8 wt % to 1.2 wt % on the catalyst powder.

4. The exhaust gas post processing apparatus of claim 1, wherein the IRA powder catalyst is formed by heat treatment at a temperature of 850° C. or more and 1100° C. or less.

5. The exhaust gas post processing apparatus of claim 1, wherein the front end honeycomb catalyst unit is formed by physically mixing the IRA powder catalyst and the three-way catalyst powder, and wherein the rear end honeycomb catalyst unit is formed by a catalyst unit in which coating layers of the IRA powder catalyst and the three-way catalyst powder are respectively disposed separately.

6. The exhaust gas post processing apparatus of claim 1, wherein the front end honeycomb catalyst unit is formed by a catalyst unit in which coating layers of the IRA powder catalyst and the three-way catalyst powder are respectively disposed separately, and wherein the rear end honeycomb catalyst unit is formed by a catalyst unit in which coating layers of the IRA powder catalyst and the three-way catalyst powder are respectively disposed separately.

7. The exhaust gas post processing apparatus of claim 1, wherein the front end honeycomb catalyst unit is formed by a catalyst unit in which coating layers of the IRA powder catalyst and the three-way catalyst powder are respectively disposed separately, and wherein the rear end honeycomb catalyst unit is formed by physically mixing the IRA powder catalyst and the three-way catalyst powder.

8. The exhaust gas post processing apparatus of claim 1, wherein the front end honeycomb catalyst unit is formed by a catalyst unit in which coating layers of the IRA powder catalyst and the three-way catalyst powder are respectively disposed separately, and wherein the rear end honeycomb catalyst unit is formed by a three-way catalyst honeycomb.

9. The exhaust gas post processing apparatus of claim 1, wherein the front end honeycomb catalyst unit is formed by physically mixing the IRA powder catalyst and the three-way catalyst powder, and wherein the rear end honeycomb catalyst unit is formed by physically mixing the IRA powder catalyst and the three-way catalyst powder.

\* \* \* \* \*